No. 798,160. PATENTED AUG. 29, 1905.
E. R. CARICHOFF.
CONTROL SYSTEM.
APPLICATION FILED NOV. 4, 1903.
4 SHEETS—SHEET 2.
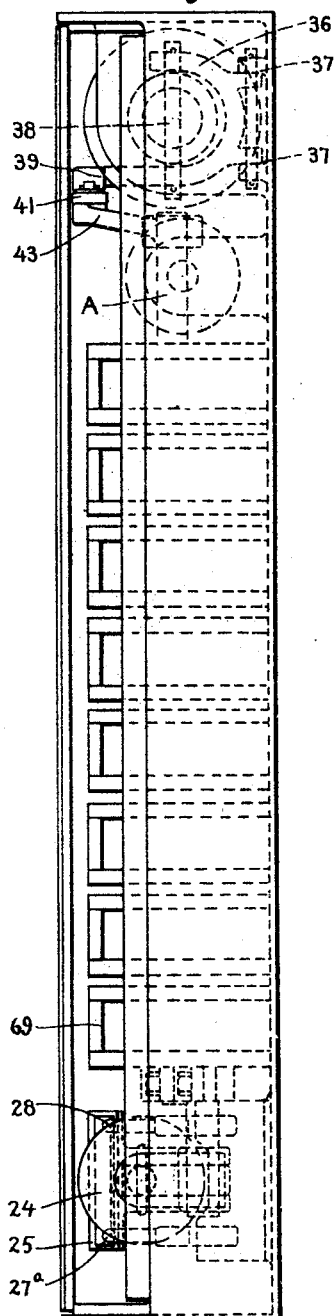
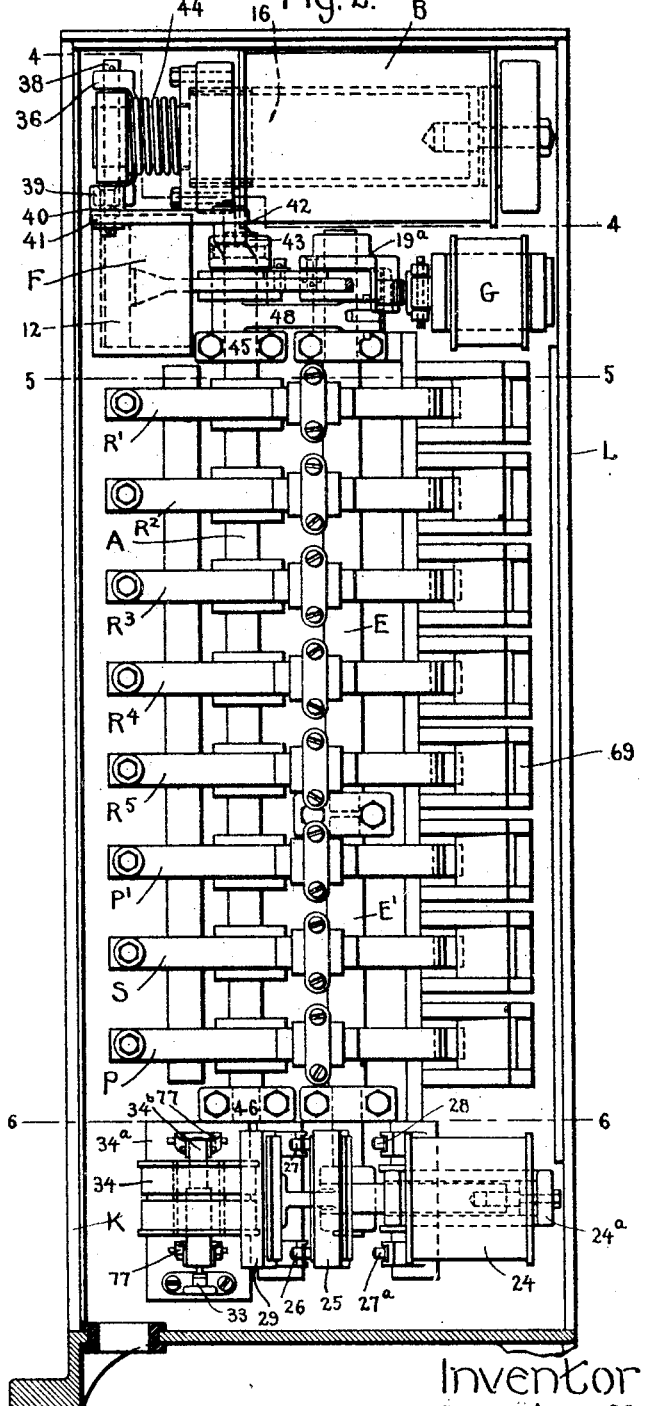
Witnesses
J. Ellis Glenn.
Helen Orford
Inventor
Eugene R. Carichoff.
By Albert G. Davis
Atty.

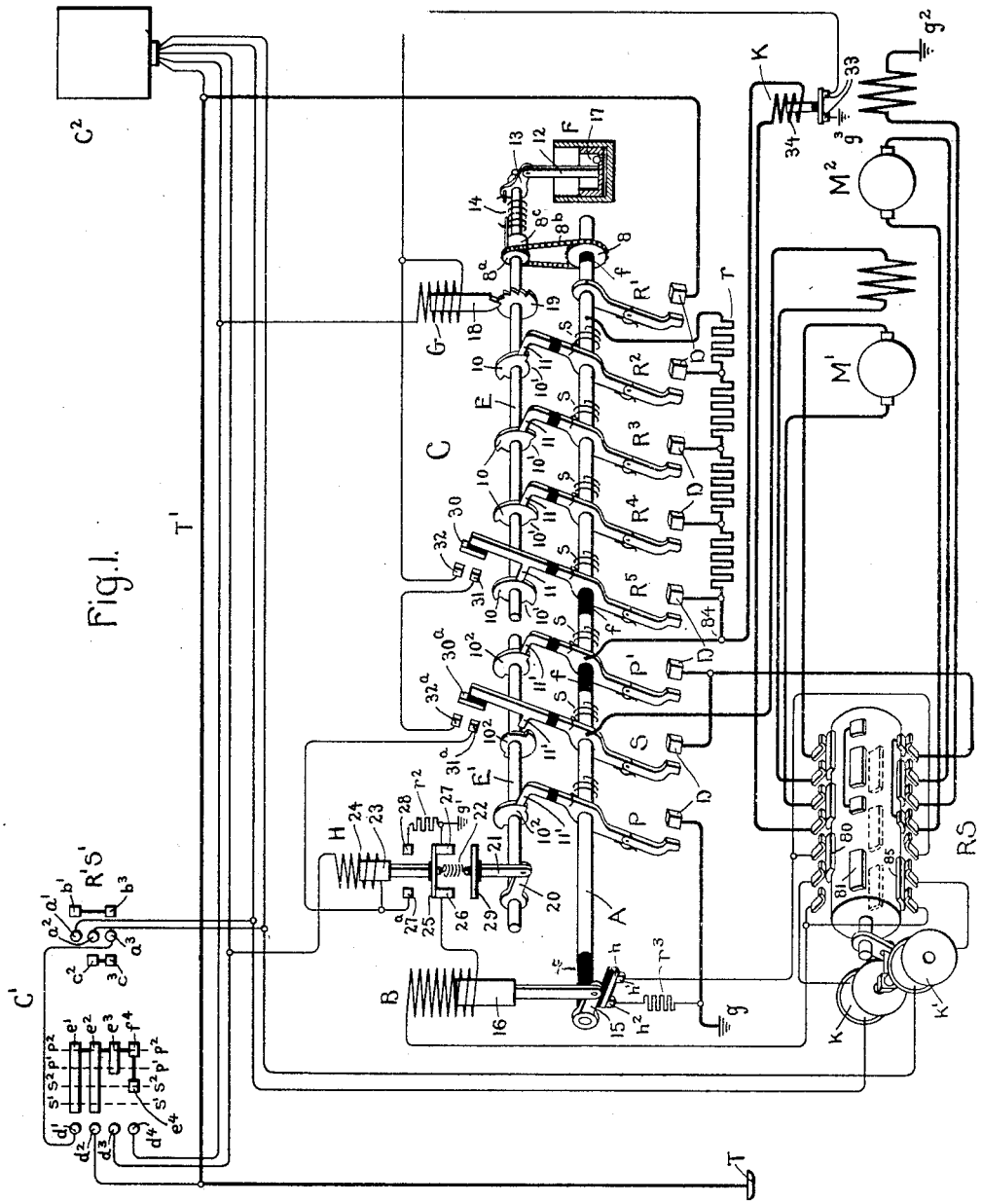

No. 798,160. PATENTED AUG. 29, 1905.
E. R. CARICHOFF.
CONTROL SYSTEM.
APPLICATION FILED NOV. 4, 1903.
4 SHEETS—SHEET 3.
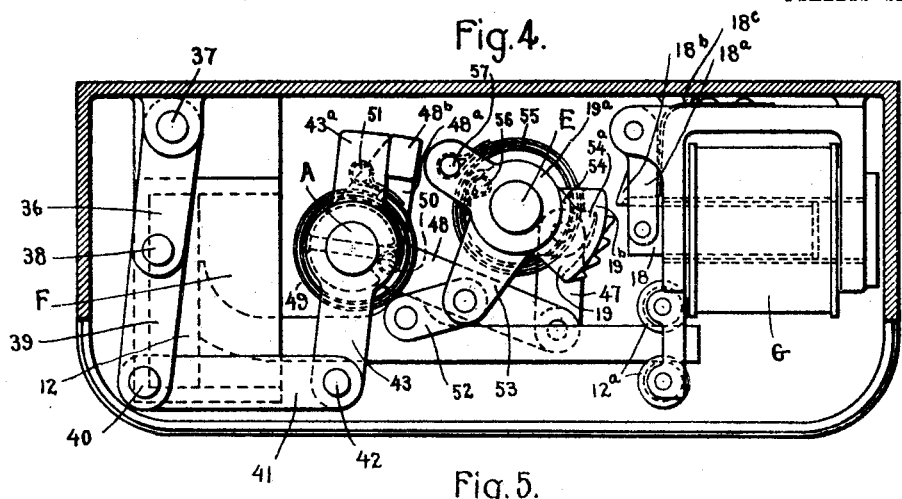
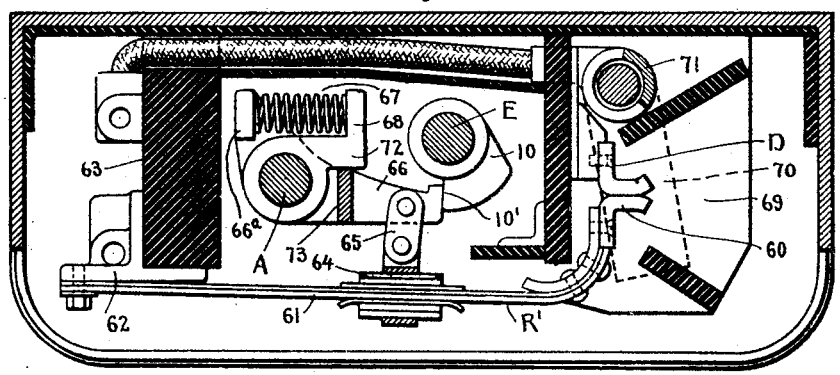
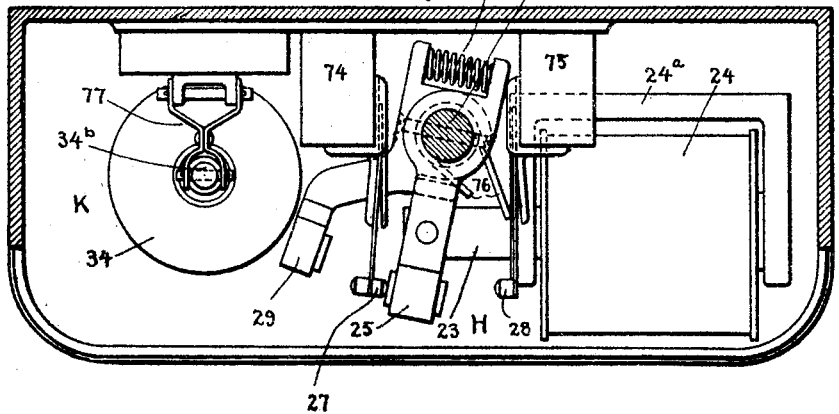
Witnesses.
J. Ellis Glenn
Helen Orford
Inventor
Eugene R. Carichoff.
By Albert G. Davis
Atty.

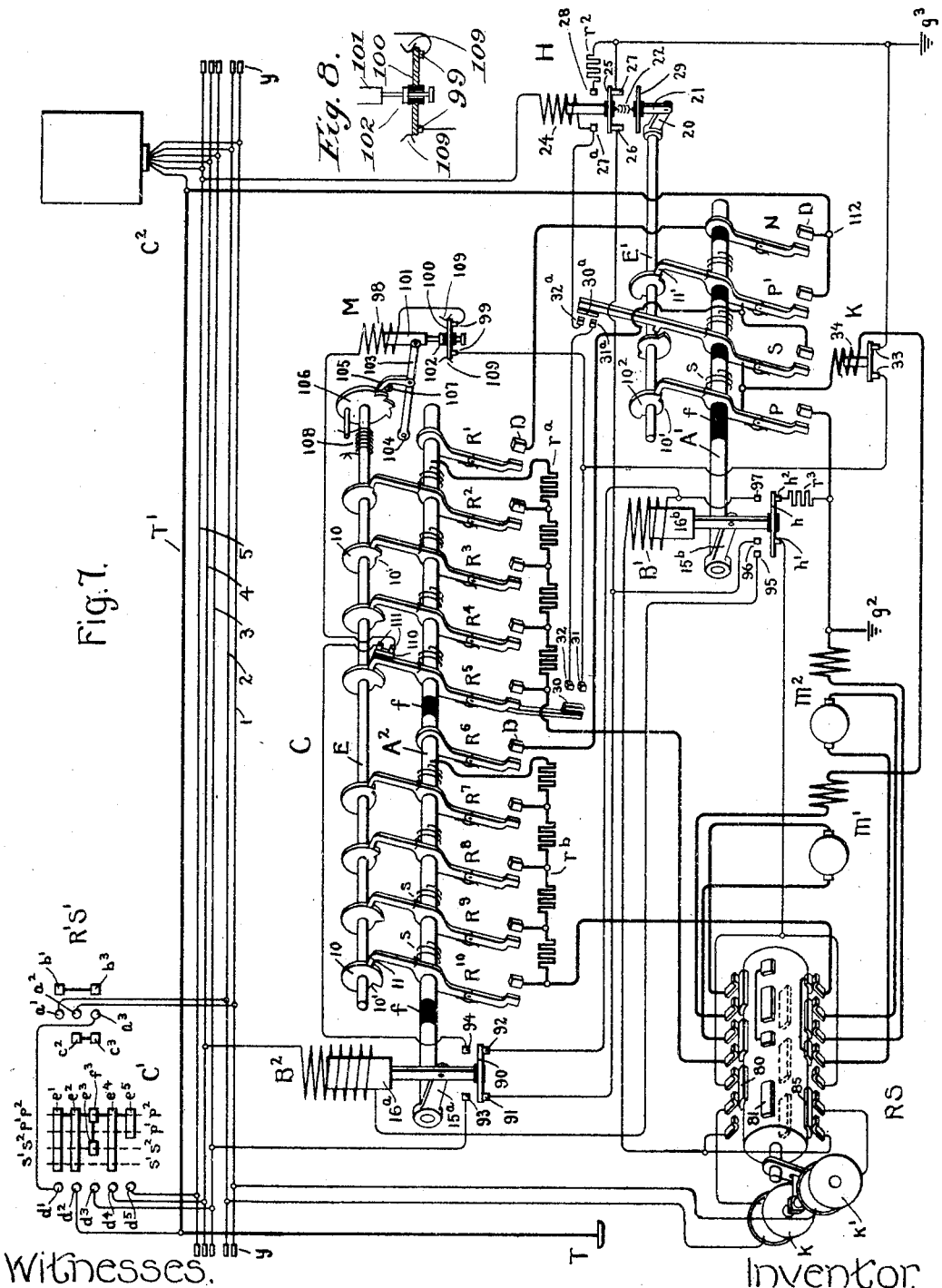

UNITED STATES PATENT OFFICE.

EUGENE R. CARICHOFF, OF EAST ORANGE, NEW JERSEY, ASSIGNOR TO GENERAL ELECTRIC COMPANY, A CORPORATION OF NEW YORK.

CONTROL SYSTEM.

No. 798,160.      Specification of Letters Patent.      Patented Aug. 29, 1905.

Application filed November 4, 1903. Serial No. 179,796.

*To all whom it may concern:*

Be it known that I, EUGENE R. CARICHOFF, a citizen of the United States, residing in the city of East Orange, county of Essex, and State of New Jersey, have invented certain new and useful Improvements in Control Systems, of which the following is a specification.

My invention relates to systems of control for electric translating devices, and is particularly adapted for use for controlling motors on electrically-propelled vehicles.

One of the objects of my invention is to simplify the construction and arrangement of the parts of a controller which are necessary to produce an efficient system of control for translating devices whereby the translating devices are connected and combined in any predetermined order and all possibility of injury to said translating devices due to a too rapid increase of current therein is eliminated.

The particular object of my invention is to produce a simple and efficient automatically-accelerating motor-control system. To this end I provide one or more normally open switches in combination with means for simultaneously placing said switches under strain tending to cause them to close and means for automatically regulating the closing of said switches in succession.

In another aspect my invention comprises means for placing one or more obstructed switches under strain tending to cause them to close, together with means for removing the obstructions from said switches, whereby they are allowed to close with a snap action in any predetermined order. The means for placing said switches under strain is so constructed and arranged that the strain on said switches may be removed at will, so as to allow them to open quickly independently of the operation of said obstructing means.

My invention also includes a series-paralleling device comprising a plurality of switches, means tending to close all of said switches, and means for obstructing the closing of certain of said switches.

In still another aspect my invention consists of a plurality of motors, a resistance, resistance-controlling switches, switches for connecting said motors in series and parallel relationship, means tending to close all of said switches, and means for automatically regulating the closing of said switches in succession to produce an automatic acceleration of the motors, the said motors being first connected in series and then in parallel.

My invention further comprises a plurality of motor-controllers, each having a plurality of switches, with means for placing said switches under strain tending to close them, means for regulating the closing of said switches in succession, and operating means for said strain-producing means and said regulating means, in combination with a master-controller for said motor-controllers, the whole being adapted to be so arranged as to produce a simple and efficient multiple-unit system of train control.

More specifically considered, my invention comprises a plurality of contact-fingers operatively connected with a rotatable shaft, the connecting means hereinafter shown being yielding springs which when the shaft is rotated place the contact-fingers under strain tending to move them into engagement with relatively fixed contacts, said contacts and fingers forming part of the controlled circuit. The contact-fingers are obstructed in their forward movement—that is, are prevented from engaging said relatively fixed contacts—by means of a series of obstructing devices which are constructed and arranged to permit said contact-fingers to be moved into engagement with said contacts with a snap action in any predetermined order and at any desired rate.

My invention also includes means for rotating the shaft which is operatively connected with said fingers so as to place the springs under tension and to remove said tension and means for operating said obstructing devices, so as to permit the fingers to engage the relatively fixed contacts successively under the action of said springs. The means for rotating said shaft may comprise a lever or levers adapted to be operated directly by hand, by electromagnets, pneumatic devices, &c., or by any other preferred mechanism. Although I have shown springs as the means for maintaining said contact-fingers under strain, it is obvious that the said springs may be replaced by mechanism operated by air-pressure, gravity, magnetic attraction, &c.

My invention further comprises details of construction and arrangement which will be hereinafter described, and more specifically pointed out in the appended claims.

My invention will be more clearly understood by reference to the accompanying drawings, of which—

Figure 1 represents a diagrammatic view of the preferred form of my control system. Fig. 2 is a front elevation of a controller structure embodying a slightly-modified form of the mechanism shown diagrammatically in Fig. 1, the casing-cover of said controller being removed. Fig. 3 is a side elevation of said controller. Fig. 4 is a sectional plan view on the line 4 4 of Fig. 2. Fig. 5 is a sectional plan view on the line 5 5, Fig. 2. Fig. 6 is a sectional plan view on the line 6 6, Fig. 2. Fig. 7 represents diagrammatically a modified motor-control system embodying my invention, and Fig. 8 shows a detail of the lost-motion device in Fig. 7.

Referring now to Fig. 1, C represents a motor-controller, comprising a plurality of separately-actuated switches or contacts adapted to control the automatic acceleration of the motors M' and M².

R' to R⁵, inclusive, represent the switches of the motor-controller, which are adapted to control the sections of the resistance $r$, which is connected in circuit with the said motors. The switches P and P' control the parallel connections of said motors, while the switch S controls the series connection of said motors. The contacts or switches include movable contact-fingers and relatively fixed contact-terminals, with which said fingers are adapted to engage. The master-controllers for said motor-controller are represented by C' and C². The reversing-switch for said motors is represented by R S, and the master reversing-switch is represented by R' S'.

All the contact-fingers of the motor-controller except one are loosely mounted on the main operating-shaft A and are operatively and yieldingly connected thereto by means of the springs $s$, which are adapted to be placed under tension by the rotation of said shaft A in such a manner as to tend to move the contact-fingers toward their relatively fixed contact-terminals D and close the switches. The contact arm or finger R' is attached to said shaft A and rotates with it. Fastened to one end of the shaft A is a lever-arm 15, to the outer end of which is pivotally connected the plunger 16 of the main operating coil or solenoid B. The solenoid B, aside from its function of placing all the springs $s$ under tension, has the additional function of acting as an underload-magnet to allow the parts of the controller to return to their initial position when the energizing-current in the controlling-circuit fails.

Mounted on the opposite end of the shaft A is a sprocket-wheel 8, which is connected by means of the sprocket-chain 8ᵇ with the sprocket-wheel 8ᵃ, attached to the sleeve 8ᶜ, loosely mounted on the shaft E. The said shaft E carries a plurality of obstructing devices 10, with which the extensions 11 of the contact-fingers of switches R² to R⁵, inclusive, are adapted to engage. The said obstructing devices 10 serve to obstruct the free forward movement of the contact-fingers toward their contact-terminals D, and they are so constructed and arranged that when the shaft E is rotated the contact-fingers of switches R² to R⁵, inclusive, are released successively. The shaft E is prevented from moving in a backward direction by the engagement of the extensions 11 with the recesses 10' in said obstructing devices. When the sleeve 8ᶜ is rotated, its movement is transmitted to the shaft E through the spring 14, but the forward movement of the shaft E is retarded by means of the dash-pot F, the plunger 12 of which is connected with the arm 13, which is rigidly fastened to said shaft. Through the agency of the check-valve 17 in the plunger 12 of the dash-pot a free downward movement of said plunger is allowed, so as to return the cam-shaft quickly to its initial position. The shaft E is locked against foward movement so long as the actuating-coil of the locking-magnet G, which is in a branch of the controlling-circuit, is deënergized, the plunger 18 being normally in engagement with the teeth of the ratchet-wheel 19, which is fastened to the shaft E.

The shaft E' carries the obstructing devices 10², which are adapted to be engaged by the extensions 11' of the contact-fingers of switches S, P, and P', respectively, and control the operation of said contact-fingers, acting to lock the series switch in its open position when the parallel switches are in operation and to lock the parallel switches in their open position when the series switch is in operation. The shaft E' also carries the lever-arm 20, to the outer end of which is pivotally attached the link 21, which is connected by means of the spring 22 with the plunger 23 of the series-parallel relay H, the actuating-coil 24 of which operates the shaft E'. The plunger 23 also carries the bridging contact member 25, which when the plunger 23 is in its lower position bridges the contacts 26 and 27 and when the said plunger is in its upper position with the coil 24 energized bridges the contacts 27ᵃ and 28. The link 21 also carries a bridging contact member 29, which when the solenoid 24 is energized and the core 23 is in its upper position bridges the contacts 26 and 27. The functions of the contacts of the series-parallel relay H will be hereinafter described.

Other actuating mechanism than that shown and described may be substituted for the coils B and 24, if so desired. The shafts may even be operated directly by hand by placing handles on the lever-arms 15 and 20. It may also be found desirable to operate the shaft E by hand independent of the shaft A.

The extensions 11 and 11' of the contact-fingers of switches R⁵ and S are provided with bridging contacts 30 and 30ª, which are respectively adapted to engage the relatively fixed contacts 31 32 and 31ª 32ª, said contacts forming auxiliary switches which act to prevent the operation of the series-parallel relay H to connect the motors in parallel unless the series switch is closed and until the several series steps have been passed through and the last resistance-controlling switch is closed.

The overload-relay K is provided for the purpose of opening the controlling-circuit at the contacts 33 whenever a predetermined excess of current flows through the actuating-coil 34, which is connected in the controlled circuit. The shaft A is shown as included in the motor-circuit and is divided into sections, which are insulated from each other and from the arm 15 and also from the sprocket-wheel 8 by means of the insulating-sections $f$. The said shaft may be made of insulating material, provided the contact-fingers are electrically connected to produce the desired result. The arm 15, carried by the shaft A, is provided with an auxiliary switch, comprising the bridging member $h$ and contacts $h'$ and $h^2$, which is adapted to open the circuit through one of the actuating-coils $k$ and $k'$ of the reversing-switch when the shaft A is rotated, thereby serving as an interlock between the reversing-switch and the motor-controller. The trolley or collector-shoe is indicated by T. This system may readily be operated as a system of train control by making slight changes in the connections between the motor-controller and the master-controller, as will be hereinafter described.

Referring now to Figs. 2 to 6, inclusive, it will be seen that the main actuating-coil B is located in the upper part of the controller-casing L. This casing may be located at a point adjacent to the master-controller or may be located at some point distant from the master-controller—for instance, under the floor of the car. The plunger 16 of said coil B is connected with the U-shaped lever 36, which is pivoted to the controller-casing at 37 and is connected with said plunger by means of the pin 38. One arm 39 of said U-shaped lever extends outwardly from the point at which the pin 38 passes through said lever and has pivotally attached to its outer end at 40 the link 41, which is pivotally connected at 42 with the crank-arm 43, rigidly mounted on the main operating-shaft A. Said connecting means between the plunger 16 and the operating-shaft A correspond to the lever-arm 15 in the diagram Fig. 1, the said plunger 16 being maintained in its outward position by means of the spring 44 instead of gravity. When the solenoid B is energized, the core 16 is drawn inwardly against the action of the spring 44, thereby rocking the lever-arm 36 about its pivots 37, moving the outer end of the arm 39 to the right and turning the crank-arm 43 to rotate the shaft A.

In the modification shown in said Figs. 2 to 6, inclusive, the main operating-shaft A, which is mounted in the bearings 45 and 46, does not form part of the motor-circuit. The shafts E and E', as before, carry the obstructing devices 10 and 10², respectively. The shaft E is connected to the shaft A by means of the link 47, Fig. 4, the bell-crank lever 48, and the spring 49. One end of the link 47 is pivoted to the sleeve 54, loosely mounted on the shaft E. Said sleeve carries a projection 54ª, which is adapted to engage the lug 19ᵇ, formed on the under side of the extension of the collar 19ª rigid on shaft E. The opposite end of said link 47 is pivoted to the outer end of one arm of the bell-crank lever 48, which is loosely mounted on the shaft A and is connected with said shaft by means of the spring 49, as shown in Fig. 4, one end of which is attached to the said bell-crank lever at 50 and the other end of which is attached at 51 to an extension 43ª of the crank-arm 43. The other arm 48ª of the bell-crank lever 48 carries a stop 48ᵇ, which normally rests against said extension 43ª. It will thus be seen that when the shaft A rotates counter-clockwise it winds up the spring 49, which tends to draw the bell-crank lever 48 about the shaft A and move the shaft E through the agency of the link connection 47 and the engagement of the extension 54ª with the lug 19ᵇ. The mechanism just described corresponds to the sprocket mechanism 8, 8ª, and 8ᵇ, sleeve 8ᶜ and spring 14 connecting the shafts A and E, as shown diagrammatically in Fig. 1.

The forward movement of the shaft E is retarded by the dash-pot F, the plunger 12 of which is connected, by means of the link 52, with the arm 53, carried by the collar 19ª, mounted on the shaft E. The sleeve 54 is connected to said collar 19ª by means of the spring 55, one end of which is attached to said sleeve 54 at 56 and the other end of which is attached to the collar 19ª at 57. The actuating-coil of the locking device G operates the core 18, to which is attached a pivoted link 18ª, carrying the pawl or locking member 18ᵇ, which is moved by spring 18ᶜ into the path of the teeth carried by the ratchet-segment 19, formed on the collar 19ª. Provided the actuating-coil of the locking mechanism G remains energized when the shaft A is rotated, the shaft E will move forward in a counter-clockwise direction under the tension of spring 49, said movement being retarded by means of the dash-pot F, the outer end of the plunger 12 of which is guided by means of the anti-friction-rollers 12ª. When the main actuating-coil B is deënergized and the shaft A returns toward its initial position, the extension 43ª engages the lug 48ᵇ and forces the bell-crank lever 48 about the shaft A, thereby drawing the extension 54ª of sleeve 54 away from the lug 19ᵇ, and the movement of said sleeve is transmitted to the collar 19ª through spring 55, thereby returning shaft E to its initial position.

Referring to Fig. 5, it will be seen that the construction and arrangement of the contact-fingers are slightly different from that shown in Fig. 1, but the operation is substantially the same. The movable contact-terminal 60 of the switch R', which is illustrated in Fig. 5, but is typical of all the switches of this controller, is mounted on the end of a flexible member 61, rigidly fastened on the bracket 62, which is mounted on the supporting-block 63 of insulating material. The member 61 is connected, through the insulating clamping-block 64, with the link 65, pivotally attached to the arm 66, corresponding to the extension 11 of the contact-fingers. (Shown in Fig. 1.) The arm 66 forms one arm of a bell-crank lever, the opposite arm 66ª of which is engaged by one end of a spring 67, the opposite end of which bears against a shoulder formed on an arm 68, rigidly attached to the shaft A. The spring 67 corresponds to the spring $s$ in Fig. 1. The obstructing device 10 is mounted on the shaft E, as before described. The relatively fixed contact-terminal D is engaged by the movable contact finger or terminal 60 within the blow-out chute 69. The said contact-terminals are embraced by the poles 70 of a blow-out magnet the coil of which is indicated at 71. In the operation of this modified form of switch-actuating mechanism when the shaft A is rotated in a counter-clockwise direction it carries with it the arms 68, thereby compressing the springs 67, so as to place the contact-finger-actuating mechanisms under strain, tending to move said fingers into engagement with the contact-terminals D. The switches will not close, however, if the arms 66 of the bell-crank levers are in engagement with the obstructing devices 10. As soon as the shaft E rotates sufficiently to allow an arm 66 to leave its obstructing device 10 the movable contact-terminal 60, regulated thereby, will engage its relatively fixed contact-terminal D with a snap action due to the sudden expansion of the spring 67. The shaft E is prevented from moving backward after the operation of a contact by the engagement of arm 66 with recess 10'. The switches are opened quickly and positively when shaft A is rotated in the opposite direction on account of the engagement of the shoulders 72, formed on the arms 68, with the lugs 73, formed on the bell-crank levers 66.

In the lower part of the controller-casing is mounted the series-parallel relay H, the actuating-coil 24 of which is supported in the frame 24ª. The core 23 of said actuating-coil 24 is pivotally connected with the bridging contact member 25, loosely mounted on the shaft E'. The bridging switch member 29 is rigidly mounted on the shaft E' and is maintained in the position relative to the member 25 (shown in Fig. 6) by means of the spring 22. The fixed contacts 26 and 27 are mounted on the insulating-block 74, and the contacts 27ª and 28 are mounted on the insulating-block 75. The bridging contact member 25 is normally maintained in engagement with the contact-fingers 26 and 27 by means of the spring 76, coiled about the shaft E'. When the solenoid 24 is energized, the core 23 is drawn to the right, thereby breaking connection between the bridging member 25 and the contacts 26 and 27 and making connection between said member 25 and the contacts 27ª and 28 and also through the agency of the spring 22 rotating the shaft E' and bringing the bridging contact member 29 into engagement with the contacts 26 and 27. This device corresponds to the series-parallel relay, (shown in Fig. 1,) the functions of which will be described later. The overload-relay K, Figs. 2 and 6, is located in the lower part of the controller-casing adjacent to the series-parallel relay H. The actuating-coil 34 of said overload-relay is mounted in the frame 34ª, and the core 34ᵇ is pivotally supported at both ends by means of the links 77. The said core is mounted to move vertically through said coil 34 and controls the contacts 33, which are connected in the controlling-circuit.

Referring again to Fig. 1, I will now describe the operation of my preferred form of motor-controller, and the operation of the modification shown in Figs. 2 to 6, inclusive, will be readily understood therefrom. Consider the master reversing-switch R' S' moved so that its contact-fingers $a^2$ and $a^3$ are in engagement with the contact-segments $c^2$ and $c^3$, respectively, and also consider that the master controlling-switch C' is moved so that its contact-fingers $d'$ and $d^2$ engage the contact-segments $e'$ and $e^2$, the said switch being in its first series position, (indicated by $s'$ $s'$.) A controlling-circuit may then be traced from the trolley or collector shoe T through the contact-finger $d^2$, contact-segments $e^2$ and $e'$, contact-finger $d'$, contact-finger $a^3$ of the master reversing-switch R' S', contact-segments $c^3$ and $c^2$, contact-finger $a^2$, actuating-coil $k'$ of the reversing-switch R S, contact-segment 85 of said reversing-switch through the main actuating-coil B, through contacts 26 and 27 of the series-parallel relay H to ground at $g'$. The completion of this circuit energizes the main actuating-coil B and rotates the main operating-shaft A. As the shaft A rotates the springs $s$ are wound up, thereby placing all the obstructed contact-fingers under strain tending to move them into engagement with their contact-terminals D. The contact-finger of switch R' is moved into engagement with its contact-terminal D. The contact-finger of switch S controlling the series connection of the motors is also allowed to move into engagement with its contact-terminal D since the shaft E' is in its series position and the obstructing device 10' does not obstruct the free forward movement of said contact-finger. Simultaneously with the rotation of the shaft A the collar $8^c$, mounted on the shaft E and fastened to the sprocket-wheel $8^a$, is rotated, thereby winding up the spring 14, which in turn tends to rotate the shaft E. In this position of the master-controller the actuating-coil of the locking-relay G is not energized, and said shaft E is thereby prevented from moving forward.

The circuit through the motors corresponding to the first position of the master-controller is as follows: from the trolley or collector shoe T, conductor T', contact-terminal D and contact-finger of switch R', right-hand section of shaft A, all the sections of the resistance $r$, actuating-coil 34 of the overload-relay K, upper contact-fingers and contact-segments of the reversing-switch R S, armature and field of motor M', switch S, through the lower reversing switch-contacts and the armature and field of the motor $M^2$ to ground at $g^2$.

The controlling and controlled circuit will remain as just traced until the master controlling-switch is moved beyond its first operative position. Let us consider that the said switch is moved into its second operative position—that is, its second series position, (indicated by $s^2 s^2$.) Then a controlling-circuit in addition to the controlling-circuit just traced is completed from the contact-segment $e^2$, through the contact-segment $e^4$, contact-finger $d^4$, actuating-coil of the locking-relay G, through the contacts 33 of the overload-relay K to ground at $g^3$. The locking-plunger 18 is thus withdrawn from engagement from the teeth of the ratchet-wheel 19, and the shaft E is thus free to rotate under the action of the spring 14 retarded by the dash-pot F. Such rotation of the shaft E causes the contact-fingers of switches $R^2$, $R^3$, $R^4$, and $R^5$ to successively engage their corresponding contact-terminals D, said fingers being released by the obstructing devices 10 and closed with a snap action by means of the springs $s$. The sections of the resistance $r$ are thus successively cut out of circuit, the contact-finger $R^5$ acting to short-circuit all of said resistance-sections.

Simultaneously with the closing of the switch $R^5$ the auxiliary switch member 30 is brought into engagement with the contacts 31 and 32, thus completing a circuit from the actuating-coil 24 of the series-parallel relay H through the auxiliary switch-contacts $30^a$, $31^a$, and $32^a$ to ground preparatory to the operation of said series-parallel relay by the movement of the master controlling-switch into its next operative position—that is, the first parallel position, (indicated by $p' p'$.) The series-parallel relay H will not operate until the master controlling-switch is moved into its parallel position, at which time the contact-segment $e^3$ of said switch is brought into engagement with the contact-finger $d^3$, and an auxiliary controlling-circuit is completed from the contact-segment $e^2$ through the contact-segment $e^3$, contact-finger $d^3$, actuating-coil 24 of the series-parallel relay H, contacts $30^a$, $31^a$, and $32^a$ of the auxiliary switch controlled by switch S, contacts 30, 31, and 32 of the auxiliary switch controlled by contact $R^5$ to ground at $g^3$ through the contacts of the overload-relay K. When the actuating-coil 24 of the series-parallel relay H is energized, the bridging switch member 25 is moved away from the contacts 26 and 27, thus breaking the circuit through the main actuating-coil B and allowing the shaft A to assume its initial position. The springs $s$ are thereby unwound, the strain is removed from all of the contact-fingers of the controller, and the switches assume their normal open position. The shaft E also rotates in a backward direction unretarded by the locking-plunger 18, which at this time is in engagement with the ratchet-wheel 19, but which is constructed to allow such unretarded backward movement. Immediately after the opening of the controlling-circuit through the main actuating-coil B at the contacts 26 and 27 a maintaining-circuit through the actuating-coil 24 is completed through the contacts $27^a$ and 28 through the resistance-section $r^2$ to ground at $g'$, thus holding said series-parallel relay in its operated position. Simultaneously with or immediately after the completion of said maintaining-circuit the circuit through the main actuating-coil B is again completed by the bridging of the contacts 26 and 27 by the switch member 29. The reënergization of the coil B again rotates the shaft A and places all the springs $s$ under tension; but before this takes place the shaft E' is rotated by the upward movement of the plunger 23 into such a position that the contact-finger of series switch S is locked in its open position by the engagement of the extension 11' of said finger with its corresponding obstructing device $10^2$, and the parallel switches P and P' are allowed to close simultaneously with the closing of the switch R'. With the motors thus connected in parallel the motor-circuits may be traced as follows: from the trolley or collector shoe T, conductor T', contact-terminal D, and contact-finger of controller-switch R', right-hand section of shaft A, all the sections of the resistance $r$, overload-coil 34 of the relay K, upper contact-segments and contact-fingers of reversing-switch R S, the armature and field of the motor M' to the left-hand section of the shaft A, switch P to ground at $g$, also branching at the point 84 through switch P', lower contact-segments and contact-fingers of the reversing switch R S, through the armature and field of the motor $M^2$ to ground at $g^2$.

When the master controlling-switch is moved into its final operative position, (indicated by $p^2$ $p^2$,) the contact-segment $f^4$ is brought into engagement with the contact-finger $d^4$, and the auxiliary controlling-circuit is again completed to ground at $g^3$ through the actuating-coil of the locking-magnet G and the contacts 33 of the overload-relay K. The completion of said auxiliary controlling-circuit reënergizes said actuating-coil and allows the shaft E to rotate, thereby allowing the resistance-controlling contact-fingers to operate successively to cut out the resistance-sections and leave the motors connected in multiple with no resistance in circuit. When it is desired to arrest the successive operation of the switches at any point and to hold the parts of the motor-controller in the position they have assumed at the time, it is merely necessary to move the master-controller so that the auxiliary controlling or locking circuit is broken at the contact-segments $e^4$ to $f^4$. This deënergizes the coil of said locking-magnet and allows the locking-plunger 18 to prevent the forward movement of shaft E.

The sequence of steps as above traced takes place automatically to connect the motors in series with resistance, then cut out said resistance, then connect the motors in parallel with resistance in circuit, and then again cut out said resistance, even if the master controlling-switch is thrown at once from its off to its final parallel position.

If during the automatic acceleration of the motors—that is, while the contact-fingers are automatically and successively cutting out sections of the starting resistance—the current rises in the motor-circuit above a predetermined value, the overload-relay K will operate to open the controlling-circuit at the contacts 33 and deënergize the actuating-coil of the locking-magnet G, thereby causing the locking-plunger 18 to engage the teeth of the ratchet 19 and prevent further forward movement of the mechanism.

Referring now to the modified form of my invention shown in the diagram Fig. 7, which differs from the modification hereinbefore described in several essential details, more particularly in the mechanism employed to rotate the shaft which controls the successive operation of the controller-switches, C, as before, indicates the motor-controller, which comprises a plurality of separately-actuated switches adapted to control the connections for the motors M' and M². The master controlling-switches are indicated by C' and C², the electromagnetically-actuated reversing-switch is indicated by R S, and the master reversing-switch by R' S'. In this modification I have also illustrated the slight change that is necessary to adapt my invention for use as a multiple-unit system of train control. The conductors 1 to 5, inclusive, are shown as train-conductors and are adapted to be connected with corresponding train-conductors in adjacent cars of the train by means of the couplings $y$, it being understood that a motor-controller, such as C, is located on each motor-car and that the master controller or controllers are located in any part of the car or train, and the several motor-controllers throughout the train are simultaneously controlled from any one master-controller. The main shaft A is divided into two separate and distinct parts A' and A², the said shafts being operated by separate actuating-coils B' and B². The shaft A² is divided into sections insulated from each other by the insulating-pieces $f$, said sections forming parts of the motor-circuit. The shaft A' is shown for the sake of clearness as made up of alternate sections of conducting and insulating material, but is preferably made of a single piece of insulating material. The contact-fingers of switches R' to R¹⁰, inclusive, are adapted to control the sections of the resistances $r^a$ and $r^b$, the resistance $r^a$ being inserted in the circuit of the motor M' and the resistance $r^b$ being inserted in the circuit of the motor M². The corresponding sections of said resistances $r^a$ and $r^b$ are cut out simultaneously during the acceleration of the motors. The contact-fingers are loosely mounted on the shaft A² and are connected therewith by means of the springs $s$, with the exception of fingers of switches R' and R⁶, which are fastened to said shaft. The shaft A' carries the contact-fingers of parallel switches P and P' and series switch S, loosely mounted thereon, but operatively connected thereto by means of the springs $s$. The shaft A' also carries the finger of switch N, fastened thereon. All of said contact-fingers are adapted to engage their corresponding relatively fixed contact-terminals D, which are connected in the motor-circuits in a manner to be hereinafter described.

Attached to the left-hand end of the shaft A² is a crank-arm 15ª, to the outer end of which is pivotally connected the core 16ª of the main actuating-coil B². The said core 16ª also carries the bridging contact member 90, which is adapted to bridge the contacts 91 and 92 when the coil B² is deënergized and to bridge the contacts 93 and 94 when said coil is energized. When the actuating-coil B² is energized, the shaft A² is rotated to wind up the springs $s$ and place the contact-fingers of controller-switches R² to R⁵ and R⁷ to R¹⁰, inclusive, under strain tending to close said switches; but they are prevented from moving forward to engage their respective contact-terminals so long as the projections 11 engage the obstructing devices 10, carried by the shaft E. The contact-fingers of switches R' and R⁶, however, which are fastened to the shaft A², are moved into engagement with their corresponding contact-terminals D.

The shaft A' carries at one end a crank-arm 15$^b$, to the outer end of which is pivotally attached the core 16$^b$ of the actuating-solenoid B'. The said core 16$^b$ also carries the auxiliary switch member $h$, which when the solenoid B' is deënergized bridges the contacts $h'$ and $h^2$, but when said solenoid is energized bridges the contacts 95, 96, and 97. The obstructing devices 10$^2$, carried by the shaft E', are so arranged as to prevent the contact-fingers of parallel switches P and P' from engaging with their corresponding contact-terminals D when the contact-finger of series switch S is moved into engagement with its contact-terminal D, and vice versa, as before described. The actuating mechanism for the shaft E' is combined with the series-parallel relay H, as before described in connection with the diagram shown in Fig. 1, and is operated when the actuating-coil 24 of said relay is energized.

The actuating mechanism for the shaft E, which I have hereinafter called a "notching-up" device, comprises the actuating-coil 98, which is connected in circuit with the contacts 99, adapted to be bridged by the bridging member 100, which is operatively connected with the core 101 of said solenoid 98 through a lost-motion device, (indicated by 102.) The said lost-motion device allows the core 101 to move a predetermined distance after coil 98 is energized before the circuit through said coil is broken at contacts 99. Pivotally attached to the core 101 is one end of the lever 103, the other end of which is pivoted at a fixed point 104. The said lever 103 carries a pawl or dog 105, which is adapted to engage the teeth of the ratchet-wheel 106, fastened to shaft E, as the core 101 and lever 103 move upwardly and is withdrawn from engagement with said teeth by contacting with the antifriction-roller 107 when the core 101 falls after the deënergization of the coil 98. It will thus be seen that when the coil 98 is energized it raises the core 101, and thereby moves the shaft E forward one step, the said shaft being held in its forward position by the engagement of the extensions 11 with recesses 10' on cams 10. Then through the medium of the lost-motion device 102 the circuit through the coil 98 is opened at the contacts 99. The spring contact-fingers 109 act to maintain the bridging contact 100 in its raised position until the lost motion of the core is taken up on the downward movement, and the contact 100 is again moved into engagement with contacts 99 with a snap action. The successive energizations of the coil 98 produce a step-by-step forward movement of the shaft E. As the shaft E moves forward it winds up the spring 108, which returns it to its initial position whenever the main actuating-coil B$^2$ is deënergized.

The contact-finger of switch R$^5$ has formed thereon an extension carrying the bridging switch member 30, which is adapted to bridge the contacts 31 and 32, connected to the series-parallel relay H, as before described. The extension 11 of said contact-finger is also provided with a switch member 110, which is adapted to bridge the contacts 111 when said contact-finger is in its open position, thereby forming an auxiliary switch which acts to limit the forward movement of the shaft E. The overload-relay, as before, is indicated by K.

The operation of the modification shown in Fig. 7 will now be described. We will consider that the master reversing-switch R' S' is moved into the same position as before described and also that the master controlling-switch C' is moved into its first operative position, (indicated by $s'$ $s'$.) Then a controlling-circuit is completed from the trolley or collector shoe T through the contact-finger $d^2$, contact-segments $c^2$ and $c'$, contact-finger $d'$, contact-finger $a^3$ of the master reversing-switch, contact-segments $c^3$ and $c^2$, contact-finger $a^2$, actuating-coil $h'$ of the reversing-switch R S, through the contact-segment 85 of said reversing-switch, actuating-coil B', contact 92 of the auxiliary switch operated by the actuating-coil B$^2$, bridging contact member 90, contact 91, contact 26 of the series-parallel switch H, bridging contact 25 and contact 27 to ground at $g^3$. The completion of said circuit causes the energization of the actuating-coil B', which in turn rotates the shaft A' to close switches S and N and also moves the bridging contact $h$. Immediately after the completion of said circuit a branch controlling-circuit is completed from the contact-segment $c^2$ of the master controlling-switch through the contact-segment $c^4$, contact-finger $d^4$, actuating-coil B$^2$, through contact 95 of the auxiliary switch controlled by the actuating-coil B', through the bridging contact membr $h$, thence through the contact 96 to the contact 26 of the series-parallel relay H, thence through the bridging contact member 25, contact 27 to ground at $g^3$. The completion of said branch controlling-circuit causes the energization of the actuating-coil B$^2$, which in turn rotates the shaft A$^2$ and winds up the springs $s$, thereby placing the contact-fingers carried by the shaft A$^2$, with the exception of the fingers of switches R' and R$^6$, under strain. Switches R' and R$^6$ are closed; but the remaining switches are prevented from closing by the obstructing devices 10.

The motor-circuit corresponding to the first position of the master-controller may be traced as follows: from the trolley or collector shoe T through the conductor T', switch N, switch R', thence through the right-hand section of the shaft A$^2$, resistance $r^a$, upper contact-fingers and contact-segments of the reversing-switch R S, through the armature and field of the motor M', thence through the actuating-coil 34 of the overload-relay K, switch S, thence through the switch R$^6$, the left-hand section of the shaft $A^2$, through all the sections of the resistance $r^b$, thence through the lower contact-fingers and contact-segments of the reversing-switch R S, through the motor $M^2$ to ground at $g^2$. The motors are thus connected in series with all of the resistance in circuit.

When the master controlling-switch C' is moved into its second operative position, (indicated by $s^2$ $s^2$,) the circuits, as before described, are maintained; but an additional controlling-circuit is completed from the contact-segment $e^2$, through the contact-segment $e^3$, contact-finger $d^3$, contacts 93 and 94, bridged by the switch member 90, which is actuated by the solenoid $B^2$, thence through the auxiliary contacts 111 and bridging member 110, carried by the contact-finger of controller-switch $R^5$, thence through the actuating-coil 98 of the notching-up device M, through the contacts 99, controlled by said coil, then through the contacts 33 of the overload-relay K to ground at $g^3$. The energization of the actuating-coil 98 thereby causes the shaft E to move forward a distance corresponding to one of the teeth of the ratchet-wheel 106. This is sufficient to cause the extensions of the contact-fingers of controller-contacts $R^2$ and $R^7$ to be released by their corresponding obstructing devices 10, thereby simultaneously cutting out the first sections of the resistances $r^a$ and $r^b$. The completion of the upward movement of the core 101 of the notching-up device causes the circuit through the actuating-coil 98 to be broken at the contacts 99, thereby deënergizing said coil 98. The core 101 immediately falls back to its initial position by gravity, which may, if desired, be assisted by a spring or other equivalent mechanism, thereby again completing the circuit through said coil 98 at the contact 99. A reënergization of said coil 98 causes the notching-up mechanism to move the shaft E forward a second step to cut out simultaneously the second sections of the resistances $r^a$ and $r^b$. The shaft E is prevented from moving backward under the action of the spring 108, since the extensions 11 successively engage the recesses 10'. This energizing and deënergizing of the actuating-coil 98 causes the corresponding sections of the resistances $r^a$ and $r^b$ to be simultaneously and automatically cut out step by step.

When the contact-finger of short-circuiting switch $R^5$ is operated, the circuit leading to the actuating-coil 98 is broken at the contacts 110 and 111, thereby stopping further progressive movement of the shaft E. At the same time a circuit is completed at the contacts 31 and 32, leading to the actuating-coil of the series-parallel relay H, so that when the master controlling-switch C' is moved into its next operative position—that is to say, its first parallel position—the circuit leading to the actuating-coil of the notching-up mechanism M is broken by the movement of the contact-segment $e^3$ away from the contact-finger $d^3$, leaving the shaft E free to move into its initial position under the action of spring 108 when released by extensions 11. A parallel controlling-circuit is also completed through the contact-segments $e^5$, contact-finger $d^5$, through the actuating-coil 24 of the series-parallel relay H, through the contact $27^a$ of said relay, thence through the contacts 32 and 31 and bridging contact 30, controlled by the switch $R^5$, through the contacts $31^a$ and $32^a$ and bridging contact $30^a$, controlled by switch S, through the contacts 33 of the overload-relay K to ground at $g^3$. The completion of this circuit causes the actuating-coil 24 to be energized to move the bridging contact member 25 of the series-parallel relay out of engagement with the contacts 26 and 27 and into engagement with the contacts $27^a$ and 28, thus completing a maintaining-circuit from the actuating-coil 24, through the contact member $27^a$, bridging contact 25, through contact 28 and resistance $r^2$ to ground at $g^3$. The movement of said bridging contact member 25 also opens the controlling-circuits through the actuating-coils $B^2$ and B', allowing the shafts A' and $A^2$ to return to their initial positions, removing the tension from the springs $s$ and opening the resistance-controlling switches, thereby allowing shaft E to return to its initial position. Immediately after the opening of the controlling-circuit at the contacts 26 and 27 the said circuit is again completed by the movement of the bridging contact member 29 into engagement with said contacts 26 and 27. The actuating-coils B' and $B^2$ are thus again energized, thereby rotating the shafts A' and $A^2$ and placing the contact-fingers under strain by means of the springs $s$, as before described. Simultaneously with the movement of the bridging contact member 29 to complete the circuit just described the shaft E' is rotated so as to lock the series contact-finger against movement and to allow the unobstructed movement of the parallel contact-fingers, which move with the contact-finger of switch N into engagement with their corresponding contact-terminals D.

The circuit through the motors corresponding to the first parallel position of the master-controller may be traced as follows: Starting from the trolley or collector shoe T, through the conductor T', switch N, switch R', right-hand section of the shaft $A^2$, all the sections of the resistance $r^a$, through the upper contact-fingers and contact-segments of the reversing-switch R S, through the motor M', through the actuating-coil 34 of the overload-relay K, switch P, to ground at $g^2$, also branching at the point 112 through switch P', switch $R^6$, left-hand end of the shaft $A^2$, through all the sections of the resistance $r^b$, thence through the lower contact-fingers and contact-segments of the reversing-switch R S, motor $M^2$, to ground at $g^2$.

When the master controlling-switch is moved into its final operative position, the circuit through the actuating-coil of the notching-up mechanism M is completed again by the movement of the contact-segment $f^3$ into engagement with the contact-finger $d^3$. The notching-up device then operates to move the shaft E forward step by step to cause the simultaneous operation of the corresponding controller-switches controlling resistance in the circuits of the motors M' and M². The sections are therefore cut out of circuit in succession until the motors are connected in parallel with no resistance in circuit. The sequence of steps, as just described, will take place even if the master-controller is thrown at once from the off to the final parallel position.

When it is desired to stop the train or cut off the supply of current to the motors, the master-controller C' is moved into its initial or off position. The actuating-coils B², B', 24, and 98 are therefore deënergized, and all the parts assume their initial positions. When it is desired to arrest the automatic movements of the motor-controller while the motors are connected in parallel, the master-controller is moved back from the position $p^2\ p^2$ to the position $p'\ p'$, and if it is desired to arrest the automatic movements of the motor-controller while the motors are connected in series the master-controller is moved back from the position $s^2\ s^2$ to position $s'\ s'$, each time rendering the notching-up device M inoperative. The operation of the overload-relay K is the same as before described in connection with the modification shown in Fig. 1.

When it is desired to operate the car or train in the opposite direction, the master reversing-switch R' S' is moved so that its contact-fingers $a'$ and $a^3$ are in engagement with the contact-segments $b'$ and $b^3$. Then if the master controlling-switch is moved into its first operative position a circuit is completed from the trolley or collector shoe T through the contact-finger $d^2$, contact-segments $e^2$ and $e'$, contact-finger $d'$, contact-finger $a^3$, contact-segments $b^3$ and $b'$, contact-finger $a'$, through the actuating-coil $k$ of the reversing-switch R S, through the auxiliary contact-segment 80 of said reversing-switch, thence through the contacts $h'$ and $h^2$ and bridging contact member $h$ of the auxiliary switch, controlled by the actuating-coil B', through the resistance-section $r^3$, to ground at $g^2$. The energization of said actuating-coil $k$ throws the reversing-switch R S into its reversed position and completes the circuit through said actuating-coil $k$ and the contact-segment 81 to the controlling-circuit in a manner now well understood in the art. The auxiliary switch, including the bridging contact member $h$ and contacts $h'$ and $h^2$, controlled by the actuating-coil B', and also the corresponding switch, controlled by the actuating-coil B in the modification shown in Fig. 1, acts to prevent the operation of the reversing-switch to reverse the motors unless the main circuit is open, and thereby forms an interlock between the controller-operating mechanism and the reversing-switch.

Although I have shown and described springs as the means for holding the contact-fingers under strain and electromagnetically-actuated means for winding up said springs and a specific form of obstructing device for preventing the free movement of said fingers, I do not care to be limited to such mechanism, as many modifications and substitutions may be made without departing from the spirit and scope of my invention, and I aim in the appended claims to cover all such variations of the invention.

What I claim as new, and desire to secure by Letters Patent of the United States, is—

1. In combination, a plurality of normally open switches, means for simultaneously placing said switches under strain tending to cause them to close, and means for automatically regulating the closing of said switches in succession.

2. In combination, a plurality of normally open switches, means for simultaneously placing said switches under strain tending to cause them to close, means for automatically regulating the closing of said switches in succession, and means for rendering said strain-producing means inoperative thereby allowing the switches to open automatically.

3. In combination, a plurality of normally open switches, means for simultaneously placing said switches under strain tending to cause them to close, means for automatically regulating the closing of said switches in succession, and means for controlling the operation of said strain-producing means.

4. In combination, a plurality of normally open switches, means for simultaneously placing said switches under strain tending to cause them to close, means for automatically regulating the closing of said switches in succession, and means for controlling the operation of said regulating means.

5. In combination, a plurality of normally open switches, means for simultaneously placing said switches under strain tending to cause them to close, means for automatically regulating the closing of said switches in succession, and means for controlling the operation of both of said means.

6. In combination, a controlled circuit, a plurality of normally open switches for controlling said circuit, means for simultaneously placing said switches under strain tending to cause them to close, means for automatically regulating the closing of said switches in succession, and means controlled by the current in the controlled circuit for automatically arresting the forward movement of said regulating means.

7. In combination, a controlled circuit, a plurality of normally open switches for controlling said circuit, means for simultaneously placing said switches under strain tending to cause them to close, manually-operated means for controlling the operation of said means, and means for automatically regulating the closing of said switches in succession.

8. In combination, a translating device, a plurality of normally open switches which control the connections to said translating device, means for placing said switches under strain tending to cause them to close, means for regulating the successive closing of said switches, and means for producing a step-by-step forward movement of said regulating means.

9. In combination, a translating device, a plurality of normally open switches which control the connections to said translating device, means for placing said switches under strain tending to cause them to close, means for regulating the successive closing of said switches, and electromagnetically-actuated means for producing a step-by-step forward movement of said regulating means.

10. In combination, a translating device, a plurality of normally open switches which control the connections to said translating device, means for placing said switches under strain tending to cause them to close, means for regulating the successive closing of said switches, and electromagnetically-actuated means adapted to successively make and break the circuit through its own actuating-coil, whereby a step-by-step forward movement of said regulating means is produced.

11. In combination, a translating device, a plurality of normally open switches which control the connections to said translating device, means for placing said switches under strain tending to cause them to close, means for regulating the successive closing of said switches, an electromagnetically-actuated notching-up device which successively makes and breaks the circuit through its own actuating-coil and produces a step-by-step forward movement of said regulating means, and means for controlling the operation of said notching-up device.

12. In combination, a translating device, a plurality of normally open switches which control the connections to said translating device, means for placing said switches under strain tending to cause them to close, means for regulating the successive closing of said switches, an electromagnetically-actuated notching-up device which successively makes and breaks the circuit through its own actuating-coil and produces a step-by-step forward movement of said regulating means, and manually-operated means for breaking the circuit through the actuating-coil of said notching-up device to arrest the forward movement of said regulating means.

13. In combination, a translating device, a plurality of normally open switches which control the connections to said translating device, means for placing said switches under strain tending to cause them to close, means for regulating the successive closing of said switches, an electromagnetically-actuated notching-up device which successively makes and breaks the circuit through its own actuating-coil and produces a step-by-step forward movement of said regulating means, and means actuated by the current in the controlled circuit for arresting the movements of said notching-up device.

14. In combination, a translating device, a plurality of normally open switches which control the connections of said translating device, means for placing said switches under strain tending to cause them to close, means for automatically regulating the closing of said switches in succession, and means for operating said regulating means.

15. In combination, a translating device, a plurality of normally open switches which control the connections of said translating device, means for placing said switches under strain tending to cause them to close, means for automatically regulating the closing of said switches in succession, and mechanism for operating said means.

16. In combination, a translating device, a plurality of normally open switches which control the connections of said translating device, means for placing said switches under strain tending to cause them to close, means for automatically regulating the closing of said switches in succession, mechanism for operating said means, and means whereby said operating mechanism is controlled from a distant point.

17. In combination, a translating device, a plurality of normally open switches which control the connections of said translating device, means for placing said switches under strain tending to cause them to close, mechanism for operating said means, means for regulating the successive closing of said switches, and electromagnetically-actuated means adapted to successively make and break the circuit through its own actuating-coil so as to produce a step-by-step forward movement of said regulating means.

18. In combination, a translating device, a plurality of normally open switches which control the connections of said translating device, means for placing said switches under strain tending to cause them to close, mechanism for operating said means, means for regulating the successive closing of said switches, an electromagnetically-actuated notching-up device adapted to successively make and break the circuit through its own actuating-coil so as to produce a step-by-step forward movement of said regulating means, and means whereby said operating mechanism and said notching-up device are controlled from a distant point.

19. In combination, a plurality of normally open switches, means for placing said switches under strain tending to cause them to close, means for automatically regulating the closing of said switches in succession, means for operating said regulating means, and means for checking the movement of said operating means when all of said switches have operated.

20. In combination, a plurality of normally open switches, means for placing said switches under strain tending to cause them to close, means for automatically regulating the closing of said switches in succession, means for operating said regulating means, and means operated by the last of said switches for checking the movement of said operating means.

21. In combination, a plurality of normally open switches, means for placing said switches under strain tending to cause them to close, means for regulating the successive closing of said switches, mechanism for producing a step-by-step forward movement of said regulating means, and means controlled by one of said switches for checking the movement of said step-by-step mechanism.

22. In combination, a plurality of normally open switches, means for placing said switches under strain tending to cause them to close, means for regulating the successive closing of said switches, an electromagnetically-actuated notching-up device for producing a step-by-step forward movement of said regulating means, and an auxiliary switch operatively connected to one of said switches for controlling the circuit through the actuating-coil of said notching-up device.

23. In combination, a translating device, a plurality of normally open switches which control the connections of said translating device, means for placing said switches under strain tending to cause them to close, means for regulating the successive closing of said switches, an electromagnetically-actuated notching-up device which successively makes and breaks the circuit through its own actuating-coil and produces a step-by-step forward movement of said regulating means, and automatically-actuated means for rendering said notching-up device inoperative after the last of said switches has operated.

24. In combination, a translating device, a plurality of normally open switches which control the connections of said translating device, means for placing said switches under strain tending to cause them to close, means for regulating the successive closing of said switches, an electromagnetically-actuated notching-up device which makes and breaks the circuit through its own actuating-coil and produces a step-by-step forward movement of said regulating means, and an auxiliary switch operatively connected with one of said switches for opening the circuit through said actuating-coil to check the operation of said notching-up device.

25. In combination, a motor, a motor-controller, comprising a plurality of normally open switches, means for simultaneously placing said switches under strain tending to cause them to close, means for automatically regulating the closing of said switches in succession, an electromagnetically-actuated reversing-switch, and an interlock between said controller and said reversing-switch, comprising an auxiliary switch operatively connected to said strain-producing means and connected in circuit with the actuating coil or coils of said reversing-switch.

26. In a motor-starting device, a motor, a resistance, a plurality of normally open switches adapted to control the amount of resistance connected in circuit with said motor, means for simultaneously placing said switches under strain tending to cause them to close, and means for automatically regulating the successive closing of said switches so as to cut out said resistance gradually.

27. In a motor-starting device, a motor, a resistance, a plurality of normally open switches adapted to control the amount of resistance connected in circuit with said motor, means for simultaneously placing said switches under strain tending to cause them to close, means for automatically regulating the successive closing of said switches so as to cut out said resistance gradually, means for operating said regulating means, and means for arresting the movement of said operating means when the resistance is all cut out of circuit.

28. In a motor-starting device, a motor, a resistance, a plurality of normally open switches adapted to control the amount of resistance connected in circuit with said motor, means for placing said switches under strain tending to cause them to close, means for automatically regulating the successive closing of said switches so as to cut out said resistance gradually, and a notching-up device for moving said regulating means forward in a step-by-step manner.

29. In a motor-starting device, a motor, a resistance, a plurality of normally open switches adapted to control the amount of resistance connected in circuit with said motor, means for placing said switches under strain tending to cause them to close, means for automatically regulating the closing of said switches so as to cut out said resistance gradually, a notching-up device for moving said regulating means forward in a step-by-step manner, and means operated by the last of said switches for automatically arresting the movement of said notching-up device when all of said resistance is cut out of circuit.

30. In a motor-starting device, a motor, a resistance, a plurality of normally open switches adapted to control the amount of resistance connected in circuit with said motor, means for placing said switches under strain tending to cause them to close, means for automatically regulating the closing of said switches so as to cut out said resistance gradually, means for operating said regulating means, and means whereby the movement of said operating means may be arrested at any desired point.

31. In a system of control, a plurality of translating devices, a series-paralleling device comprising a plurality of separately-actuated switches, means tending to close all of said switches, and means for obstructing the closing of certain of said switches.

32. In a system of control, a plurality of translating devices, a series-paralleling device comprising a plurality of separately-actuated switches, means tending to close all of said switches, means for obstructing the closing of certain of said switches, and means for removing said obstructing means.

33. In a system of control, a plurality of translating devices, a series-paralleling device comprising a plurality of separately-actuated switches, means tending to close all of said switches, means for obstructing the closing of certain of said switches, and electromagnetically-actuated means for removing said obstructing means to allow the switches to close.

34. In a system of control, a plurality of translating devices, a series-paralleling device comprising a plurality of separately-actuated switches, means tending to close all of said switches, means for obstructing the closing of certain of said switches, means for removing said obstructing means to allow the switches to close, and means located at a distant point for controlling said obstruction-removing means.

35. In a system of control, a plurality of translating devices, a series-paralleling device comprising a plurality of separately-actuated switches, means for placing said switches under strain tending to close the same, and means for obstructing the closing of certain of said switches.

36. In a system of control, a plurality of translating devices, a series-paralleling device comprising a plurality of separately-actuated switches, electromagnetically-actuated means for placing said switches under strain tending to close the same, and means for obstructing the closing of said switches.

37. In a system of control, a plurality of translating devices, a series-paralleling device comprising a plurality of separately-actuated switches, means tending to close all of said switches, and means for obstructing the closing of certain of said switches, said obstructing means being so constructed and arranged as to prevent the series and parallel connections through said translating devices from being completed at the same time.

38. In a system of control, a plurality of translating devices, a series-paralleling device comprising a plurality of switches, means tending to close all of said switches, devices for obstructing the closing of certain of said switches, a shaft on which said devices are mounted, and an actuating-coil for rotating said shaft to remove said obstructing devices.

39. In a system of control, a plurality of translating devices, a series-paralleling device comprising a plurality of switches, means tending to close said switches, means for obstructing the closing of certain of said switches, a relay, and means for yieldingly connecting said obstructing means to said relay so that when the actuating-coil of said relay is energized the contacts of the relay are operated and the obstructing means are removed to allow the switches to close.

40. In a system of control, a plurality of translating devices, a series-paralleling device comprising a plurality of switches, means tending to close said switches, devices for obstructing the closing of certain of said switches, a shaft on which said devices are mounted, a relay, and means for yieldingly connecting said shaft to said relay whereby when the actuating-coil of said relay is energized the contacts of the relay are operated and said shaft is rotated to allow the switches to close.

41. In combination, a plurality of motors, a resistance, resistance-controlling switches, switches for connecting said motors in series and parallel relationship, means tending to close all of said switches, and means for automatically regulating the closing of said switches in succession to produce an automatic acceleration of said motors, the said motors being first connected in series and then in parallel.

42. In combination, a plurality of motors, a resistance, resistance-controlling switches, switches for connecting said motors in series and parallel relationship, means for placing said switches under strain tending to close them, and means for automatically regulating the closing of said switches in succession to produce an automatic acceleration of said motors, the motors being first connected in series and then in parallel.

43. In combination, a plurality of motors, a resistance, resistance-controlling switches, switches for connecting said motors in series and parallel relationship, means tending to close all of said switches, means for automatically regulating the closing of said switches in succession to produce an automatic acceleration of said motors through series and parallel, and means for preventing the operation of the parallel-controlling switches until the last series resistance-controlling switch has operated.

44. In combination, a plurality of motors, a resistance, resistance-controlling switches, switches for connecting said motors in series and parallel relationship, means tending to close all of said switches, means for automatically regulating the closing of said switches in succession to produce an automatic acceleration of said motors, the said motors being first connected in series and then in parallel, means for operating said regulating means, and means whereby the forward movement of said operating means may be arrested at any desired point.

45. In combination, a plurality of motors, a resistance, resistance-controlling switches, switches for connecting said motors in series and parallel relationship, means for placing said switches under strain tending to close them, means for automatically regulating the successive closing of said switches to produce an automatic acceleration of said motors through series and parallel, and electromagnets for operating said strain-producing means and said regulating means.

46. In combination, a plurality of motors, a resistance, resistance-controlling switches, switches for connecting said motors in series and parallel relationship, means for placing said switches under strain tending to close them, means for automatically regulating the successive closing of said switches to produce an automatic acceleration of said motors through series and parallel, electromagnets for operating said strain-producing means and said regulating means, and means for breaking the circuit through the magnet which operates said strain-producing means so as to allow the switches to open while the regulating means for the series and parallel switches is being operated.

47. In combination, a plurality of motors, a resistance, resistance-controlling switches, switches for connecting said motors in series and parallel relationship, means for placing said switches under strain tending to close them, means for automatically regulating the successive closing of said switches to produce an automatic acceleration of the motors, means for operating said regulating means, and means for preventing the regulating means for the series and parallel switches from being operated to allow the motors to be connected in parallel until the series switch has first been closed.

48. In combination, a plurality of motors, a resistance, resistance-controlling switches, switches for connecting said motors in series and parallel relationship, means for placing said switches under strain tending to close them, means for automatically regulating the successive closing of said switches to produce an automatic acceleration of the motors, means for operating said regulating means, and an auxiliary switch operatively connected with the series switch for preventing the regulating means for the series and parallel switches from being operated to allow the motors to be connected in parallel until the series switch has first been closed.

49. In combination, a plurality of motors, a resistance, resistance-controlling switches, switches for connecting said motors in series and parallel relationship, means for placing said switches under strain tending to close them, means for automatically regulating the closing of said switches in succession to produce an automatic acceleration of said motors through series and parallel, an electromagnet for operating said strain-producing means, and a relay for breaking the circuit through the magnet which operates the strain-producing means and for operating the regulating means for the series and parallel switches.

50. In combination, a plurality of motors, a resistance, resistance-controlling switches, switches for connecting said motors in series and parallel relationship, means for placing said switches under strain tending to close them, means for automatically regulating the successive closing of said switches to produce an automatic acceleration of said motors through series and parallel, an electromagnet for operating said strain-producing means, a relay for breaking the circuit through the magnet which operates the strain-producing means and for operating the regulating means for the series and parallel switches, and a master-controller for said electromagnet and said relay.

51. In combination, a plurality of motors, a resistance, resistance-controlling switches, switches for connecting said motors in series and parallel relationship, means for placing said switches under strain tending to close them, means for automatically regulating the successive closing of said switches to produce an automatic acceleration of said motors through series and parallel, an electromagnet for operating said strain-producing means, a relay for breaking the circuit through the magnet which operates the strain-producing means and for operating the regulating means for the series and parallel switches, and an auxiliary switch operatively connected to one of said normally open switches for controlling the operation of said relay.

52. In combination, a plurality of motors, a resistance, separately-actuated resistance-controlling switches, series and parallel switches, means for placing said switches under strain tending to close them, means for regulating the closing of said switches so as to connect the motors in series with resistance in circuit, then to cut out said resistance gradually, then to connect the motors in parallel with resistance in circuit, and then to cut out said resistance gradually, thereby producing an automatic acceleration of said motors through series and parallel, and means for operating said regulating means.

53. In combination, a plurality of motors, a resistance, separately-actuated resistance-controlling switches, series and parallel switches, means for placing said switches under strain tending to close them, means for regulating the closing of said switches so as to connect the motors in series with resistance in circuit, then to cut out said resistance gradually, then to connect the motors in parallel with resistance in circuit, and then to cut out said resistance gradually, thereby producing an automatic acceleration of said motors through series and parallel, means for operating said regulating means, and means whereby the movement of said operating means may be arrested at any desired point.

54. In combination, a plurality of normally open switches, a rotatable shaft, means for yieldingly connecting said switches to said shaft so that when said shaft is rotated the switches will be placed under strain tending to close the same, and means for automatically regulating the successive closing of said switches.

55. In combination, a plurality of normally open switches, a rotatable shaft, means for yieldingly connecting said switches to said shaft so that when said shaft is rotated the switches will be placed under strain tending to close the same, an electromagnet for rotating said shaft, and means for automatically regulating the successive closing of said switches.

56. In combination, a plurality of normally open switches, a rotatable shaft, means for yieldingly connecting said switches to said shaft so that when said shaft is rotated the switches will be placed under strain tending to close them, means for rotating said shaft, means for controlling the operation of said shaft-rotating means, and means for automatically regulating the successive closing of said switches.

57. In combination, a plurality of normally open switches, a rotatable shaft, means for yieldingly connecting said switches to said shaft so that when the shaft is rotated the switches are placed under strain tending to close them, a plurality of obstructing devices operatively related to said switches, and means for operating said obstructing devices with a slow forward movement to release said switches in succession.

58. In combination, a plurality of normally open switches, a rotatable shaft, means for yieldingly connecting said switches to said shaft so that when the shaft is rotated the switches are placed under strain tending to close them, a plurality of obstructing devices operatively related to said switches, and means for operating said obstructing devices with a step-by-step forward movement to release said switches in succession.

59. In combination, a plurality of normally open switches, a rotatable shaft, means for yieldingly connecting said switches to said shaft so that when the shaft is rotated the switches are placed under strain tending to close them, a plurality of obstructing devices operatively related to said switches, means for operating said obstructing devices to release said switches in succession, and means for returning said obstructing devices to their initial position when the switches are opened.

60. In combination, a plurality of normally open switches, a rotatable shaft, means for yieldingly connecting said switches to said shaft so that when the shaft is rotated the switches are placed under strain tending to close them, a plurality of obstructing devices operatively related to said switches, an electromagnetically-actuated notching-up device for operating said obstructing devices with a step-by-step forward movement, and means whereby the actuating-coil of said notching-up device is successively energized and deënergized.

61. In combination, a plurality of normally open switches, a rotatable shaft, means for yieldingly connecting said switches to said shaft so that when the shaft is rotated the switches are placed under strain tending to close them, a plurality of obstructing devices operatively related to said switches, means for operating said obstructing devices to release said switches in succession, and means for maintaining said obstructing devices in their operated position independent of said operating means.

62. In combination, a plurality of normally open switches, a rotatable shaft, means for yieldingly connecting said switches to said shaft so that when the shaft is rotated the switches are placed under strain tending to close them, a plurality of obstructing devices operatively related to said switches, means for operating said obstructing devices to release said switches in succession, and means for interrupting the movement of said operating means when the last switch is operated.

63. In combination, a plurality of normally open switches, a rotatable shaft, means for yieldingly connecting said switches to said shaft so that when the shaft is rotated the switches are placed under strain tending to close them, a plurality of obstructing devices operatively related to said switches, an electromagnetically-actuated notching-up device for operating said obstructing devices with a step-by-step forward movement, and a manually-operated master-switch adapted to open the circuit through the actuating-coil of said notching-up device.

64. In combination, a plurality of normally open switches, a rotatable shaft, means for yieldingly connecting said switches to said shaft so that when the shaft is rotated the switches are placed under strain tending to close them, a plurality of obstructing devices operatively related to said switches, an electromagnetically-actuated notching-up device for operating said obstructing devices with a step-by-step forward movement, and an auxiliary switch operatively connected to one of said normally open switches and adapted to open the circuit through the actuating-coil of said notching-up device when said normally open switch operates, thereby arresting the movement of said notching-up device.

65. In combination, a plurality of separately-actuated contact-fingers, a plurality of relatively fixed contacts in the path of said fingers, means for placing said fingers under strain tending to cause them to engage said relatively fixed contacts, means for obstructing the forward movement of said fingers, and means for removing said obstructing means whereby the contact-fingers are allowed to move in any predetermined order.

66. In combination, a plurality of relatively fixed contacts, a plurality of separately-actuated obstructed contact-fingers, means for placing said fingers under strain tending to move them into engagement with said fixed contacts, and means for serially removing the obstructions from said fingers in such a manner as to permit the contact-fingers successively to engage the fixed contacts with a snap action.

67. In a control system, a controlled circuit, a plurality of relatively fixed contacts and movable contact-fingers forming part of the controlled circuit, a rotatable shaft, springs for connecting said fingers to said shaft, means for rotating said shaft so as to place said fingers under strain tending to close the contacts, a series of obstructing devices constructed and arranged to permit said fingers to be moved into engagement with said fixed contacts in any predetermined order and at any desired rate, and means for operating said obstructing devices.

68. In a system of train control, a plurality of motors, a plurality of motor-controllers, each comprising a plurality of normally open switches, means for placing said switches under strain tending to close them, means for regulating the successive closing of said switches, and operating means for the strain-producing means and said regulating means, in combination with a master-controller for said operating means.

69. In a system of train control, a plurality of motors, a plurality of series-paralleling devices, each comprising a plurality of separately-actuated switches, means tending to close said switches, means for obstructing the closing of certain of said switches, and means for removing said obstructing means, in combination with means for controlling the obstruction-removing means.

70. In a system of train control, a plurality of motors, a plurality of series-paralleling devices, each comprising a plurality of separately-actuated switches, means for placing said switches under strain tending to close them, means for obstructing the closing of said switches, and means for removing said obstructions, in combination with means for controlling the strain-producing means and the obstruction-removing means.

71. In a system of train control, a plurality of motors, resistances, a plurality of motor-controllers, comprising resistance-controlling switches, switches for connecting the motors in series and parallel relationship, means tending to close all of said switches, and means for automatically regulating the closing of said switches in succession to produce an automatic acceleration of said motors, in combination with a master-controller for said motor-controllers.

72. In a system of train control, a plurality of motors, resistances, a plurality of motor-controllers, each comprising separately-actuated resistance-controlling switches, series and parallel switches, means for placing said switches under strain tending to close them, means for operating said strain-producing means, means for regulating the closing of said switches so as to connect the motors in series with the resistance in circuit, then to cut out said resistance gradually, then to connect the motors in parallel with the resistance in circuit, and then to cut out said resistance gradually, and means for operating said regulating means, in combination with a master-controller for said motor-controllers.

73. A plurality of circuit-closers, a controlling-solenoid therefor, a device for locking said circuit-closers in open position, and means for successively releasing said circuit-closers from said locking device.

74. A plurality of circuit-closers, a controlling-solenoid therefor, a device for locking said circuit-closers in open position, and means for moving said device to release said circuit-closers successively.

In witness whereof I have hereunto set my hand this 31st day of October, 1903.

EUGENE R. CARICHOFF.

Witnesses:
ANDREW M. COYLE,
AUG. AUDRIN.